(12) United States Patent
Braun

(10) Patent No.: US 10,890,202 B2
(45) Date of Patent: Jan. 12, 2021

(54) FASTENING ELEMENT WITH A NON-PERMEABLE ADHESIVE RING

(71) Applicant: tesa SE, Norderstedt (DE)

(72) Inventor: Frank Braun, Gruendau (DE)

(73) Assignee: tesa SE, Norderstedt (DE)

( * ) Notice: Subject to any disclaimer, the term of this patent is extended or adjusted under 35 U.S.C. 154(b) by 131 days.

(21) Appl. No.: 16/325,755

(22) PCT Filed: Aug. 22, 2017

(86) PCT No.: PCT/EP2017/071119
§ 371 (c)(1),
(2) Date: Feb. 15, 2019

(87) PCT Pub. No.: WO2018/037003
PCT Pub. Date: Mar. 1, 2018

(65) Prior Publication Data
US 2019/0178278 A1    Jun. 13, 2019

(30) Foreign Application Priority Data

Aug. 23, 2016  (DE) .......................... 10 2016 115 639

(51) Int. Cl.
*F16B 11/00* (2006.01)
*A47K 10/10* (2006.01)
*F16M 13/02* (2006.01)

(52) U.S. Cl.
CPC ............ *F16B 11/006* (2013.01); *A47K 10/10* (2013.01); *A47K 2201/02* (2013.01); *F16M 13/02* (2013.01)

(58) Field of Classification Search
CPC .. F16B 11/006; F16B 37/048; A47K 2201/02; A47K 10/10; F16M 13/02; C09J 133/04
See application file for complete search history.

(56) References Cited

U.S. PATENT DOCUMENTS

| 7,207,543 B2 | 4/2007 | Ortwein |
| 8,623,170 B2 | 1/2014 | Oertli et al. |
| (Continued) | | |

FOREIGN PATENT DOCUMENTS

| CN | 101885954 A | 11/2010 |
| CN | 101900160 A | 12/2010 |
| (Continued) | | |

OTHER PUBLICATIONS

English Abstract of DE 4416884 A1, Nov. 23, 1995.
(Continued)

*Primary Examiner* — Vishal I Patel
(74) *Attorney, Agent, or Firm* — Cahn & Samuels, LLP

(57) ABSTRACT

A method for attaching a fastening element to a surface includes arranging a basic body in contact with the surface using an adhesive ring. The surface, the adhesive ring, and a gap therebetween form airtight barriers of a space. The basic body has at least one air- and/or water-permeable connection between the space and an outer side of the basic body. An adhesive is introduced into the space so that it is filled with a quantity of adhesive which has a contact surface with the basic body. A curing process for the adhesive provides moisture, wherein prior to the curing process or/and during the curing process, the adhesive ring and the quantity of adhesive are heated so that some of the adhesive located in the region of the contact surface forms an insulating layer which is cured over and beyond the contact surface and constitutes a further airtight barrier for the remaining quantity of adhesive which has not cured.

14 Claims, 1 Drawing Sheet

(56) References Cited

U.S. PATENT DOCUMENTS

| | | | |
|---|---|---|---|
| 8,663,417 | B2 | 3/2014 | Braun |
| 9,441,659 | B2 | 9/2016 | Ortwein |
| 2005/0012002 | A1* | 1/2005 | Ortwein ............... F16B 11/006 248/205.3 |
| 2010/0032093 | A1 | 2/2010 | Braun |
| 2013/0272775 | A1* | 10/2013 | Ortwein ............... F16B 11/006 403/66 |

FOREIGN PATENT DOCUMENTS

| | | |
|---|---|---|
| DE | 4416884 A1 | 11/1995 |
| DE | 102008037095 B3 | 4/2010 |
| DE | 102009031188 A1 | 12/2010 |
| DE | 102010056221 A1 | 6/2012 |
| DE | 202014101631 U1 | 4/2014 |
| DE | 102013208619 A1 | 11/2014 |
| EP | 1329580 A2 | 7/2003 |
| EP | 2267052 A1 | 12/2010 |
| JP | 5939261 B2 | 6/2016 |
| WO | 03/036106 A1 | 5/2003 |
| WO | 2012084476 A1 | 6/2012 |

OTHER PUBLICATIONS

English Abstract of EP 1329580 A2, Jul. 23, 2003.
English Abstract of WO 2012084476 A1, Jun. 28, 2012.
EPO Machine translation of specification of DE 202014101631 U1, Apr. 14, 2014.
EPO Machine translation of specification of DE 102013208619 A1, Nov. 13, 2014.
English Abstract of DE 102008037095, Apr. 29, 2010.
English Abstract of WO 03/036106, May 1, 2003.
English Abstract of EP 2267052 A1, Dec. 29, 2010.
English Abstract of DE 102010056221 A1, Jun. 28, 2012.
English translation of International Preliminary Report on Patentability, dated Feb. 28, 2019.
Machine translation for CN101885954 A, Nov. 17, 2010.
English Abstract for CN101900160 A, Dec. 1, 2010.
English Abstract for CN101885954 A, Nov. 17, 2010.
China National Intellectual Property Office Action for Application No. 201780051655.3, dated Apr. 1, 2020.
Japan Patent Office Office Action for Application No. 2019-511403, dated May 12, 2020.

* cited by examiner

FASTENING ELEMENT WITH A NON-PERMEABLE ADHESIVE RING

This patent application is a U.S. national stage application of PCT international application PCT/EP2017/071119 filed on 22 Aug. 2017 and claims priority of German patent document 10 2016 115 639.6 filed on 23 Aug. 2016, the entireties of which are incorporated herein by reference.

The invention relates to a method for attaching a main body of a fastening element to a surface, which fastening element is designed to connect objects to the surface. In a further aspect, the present invention relates to a fastening element for attaching objects to a surface, which fastening element is suitable for being attached to the surface in accordance with the method according to the invention.

BACKGROUND OF THE INVENTION

A typical field of application of such fastening elements is the fixed attachment of objects such as towel holders, shelves, lights or such fittings and fixtures to a wall, ceiling, floor or similar surface, in particular in rooms equipped with glazed tiles, marble slabs or with such wall claddings. The fastening element or the main body of the fastening element is connected to the surface by use of an adhesive. The adhesive is usually constituted by a glue which hardens under the addition of moisture.

Fastening elements of this type are known, for instance, from DE 10 2008 037 095 B3, DE 44 16 884 A1 or WO 03/036106 A1.

It has been shown, however, that the fastening elements known from the prior art, depending on the environmental conditions in the vicinity of the fastening element, can be fully loaded only after a curing time of the adhesive of up to 12 hours. Specifically in the commercial field, such a long assembly time, however, finds only low acceptance, since attachment and loading of the fastening element cannot be performed within a workday of usually 8-hour duration.

In particular, the inventors of the present invention have found that when load is applied to the fastening element or the main body, which is connected to the surface by not yet fully cured adhesive, air is drawn into the vicinity of the adhesive or even into the adhesive itself, for instance via air-permeable connections which extend through the main body, or via leaks between an adhesive ring, with which the main body can be prepositioned on the surface, and the surface. As a result, bubbles can form in the contact areas between adhesive and surface and/or between adhesive and main body or in the adhesive itself, so that, due to the formation of bubbles, a reduction of the holding force of the fastening element or of the main body against the surface can take place.

The object of the present invention is therefore to provide a method for attaching a main body of a fastening element to a surface, and a fastening element for attaching objects to a surface, which fastening element is designed to be attached in accordance with the method according to the invention and by means of which, in a simple manner, the full load-bearing capacity of the fastening element can be achieved earlier.

SUMMARY OF THE INVENTION

This object is achieved by a method for attaching a main body of a fastening element to a surface, which fastening element is designed to connect objects to the surface, wherein the method comprises the steps:

arrangement of the main body in contact against the surface, wherein the main body is connected to the surface by use of an adhesive ring, so that the surface, the adhesive ring and a joint that is present therebetween form airtight barriers of a space arranged between them and the main body, wherein the main body has at least one air-permeable and/or water-permeable connection between the space and an outer side of the main body, said outer side being separated from the space by the main body, or the main body, already upon the arrangement of the main body on the surface, contains moisture which can be provided to the quantity of adhesive, introduction of an adhesive into the space, so that this is filled with a quantity of adhesive which has a contact area with the main body, initiation of a curing process for the quantity of adhesive by providing moisture for the quantity of adhesive found in the space, wherein, prior to the initiation of the curing process and/or during the curing process, the adhesive ring and the quantity of adhesive are heated such that that part of the quantity of adhesive that is found in the region of the contact area forms an insulating layer which is cured in an areally homogeneous manner over the contact area and which constitutes a further airtight barrier for the remaining part of the not yet cured quantity of adhesive.

In addition, this object is achieved by a fastening element for attaching objects to a surface, comprising a main body and an adhesive ring, which define a space for an adhesive, wherein the main body comprises at least one air-permeable and/or water-permeable connection between the space and an outer side of the main body, said outer side being separated from the space by the main body, wherein the fastening element is suitable for being attached to the surface in accordance with the method according to the invention.

By virtue of the method according to the invention, it can be achieved that the adhesive ring becomes softer and can better adapt to unevennesses in the surface and/or the main body, whereby it can be ensured, even in the case of uneven surfaces, that the abovementioned joint constitutes an airtight barrier.

On the other hand, by virtue of the method according to the invention, it can be achieved that the adhesive ring adapted to the unevennesses in the surface, after having been cooled, makes movements of the adapter relative to the surface more difficult.

Crucial for the holding force of the fastening element is, in particular, that, by use of the method according to the invention, a not yet cured portion of the quantity of adhesive is hermetically enclosed, namely by the surface to which the fastening element or the main body is attached, the adhesive ring, and the aforementioned areally homogeneously cured insulating layer, so that it can be prevented that, when load is applied to the main body, air is drawn into the not yet cured portion of the quantity of adhesive, whereby the holding force can be reduced due to the formation of bubbles.

Typically, by use of the method according to the invention, the insulating layer consisting of cured adhesive can have a thickness of about 0.1 to 0.2 mm after a curing time of approximately one hour.

Where the main body, already upon the arrangement of the as the main body on the surface, contains moisture which can be provided to the quantity of adhesive, the application of moisture to the main body can be dispensed with or can take place in addition to the moisture already contained in the main body.

In a refinement of the invention, it is proposed that the adhesive can be formed of an elastic, moisture-curable single-component glue or sealant.

Advantageously, the heating can be performed for a period of 1 min to 5 min, in particular of 2 min. In this way, it can be ensured that the curing process can be reliably and homogeneously initiated, so that the above-described insulating layer can form correspondingly.

In this context, it is advantageous that, during the heating, the adhesive ring and the quantity of adhesive are heated to a temperature of 60° C. to 80° C., in particular of 70° C. to 80° C. Based on these parameters, a reliable and, in particular, non-destructive arrangement of the main body on the surface can be achieved.

In a refinement of the invention, the step of providing moisture for the quantity of adhesive can comprise an application of moisture to the main body. This can be, for instance, a spraying of water or a water mist onto the main body. The moisture applied to the main body can here be transported through the main body to the quantity of adhesive, so that the curing process for the quantity of adhesive, which in this refinement is formed of an adhesive which hardens in reaction with water, can be initiated.

The main body can, for instance, have apertures or channels via which the moisture, for instance due to the kinetic energy of the spray-on process, can make its way to the quantity of adhesive.

Alternatively or additionally, the main body can be of at least partially porous configuration, so that moisture applied to the main body, for instance due to capillary action, can make its way to the quantity of adhesive.

It is here advantageous that moisture is applied to the main body such that, or the main body is configured such that, to those portions of the quantity of adhesive which lie adjacent to those portions of the main body which are capable of admitting air and/or moisture, moisture is provided, so that the above-described insulating layer can be homogeneously formed. In the case of a completely porous main body, this can be achieved, for instance, by a moisture distribution which is uniform over that surface of the main body that is accessible for an application of moisture.

Advantageously, the main body can comprise a moisture reservoir originally filled with moisture, which moisture reservoir, in that state of the main body in which it is arranged on the surface, is connected to the quantity of adhesive. The moisture reservoir can here be arranged in the main body such that it itself is directly in contact with the quantity of adhesive, or such that the moisture contained in the moisture reservoir enters into contact with the quantity of adhesive via an appropriate connection arrangement.

In a refinement of the invention, the adhesive ring, in particular in the heated state, can adapt to unevennesses in the surface on which the main body is arranged. At this point, reference should be made to the above-described advantages and effects which can be obtained upon heating of the adhesive ring. In addition, it can hereby be achieved that, because the adhesive ring can even in unheated state adapt to unevennesses in the surface, no adhesive, as it is introduced into the space, can pass through between the adhesive ring and the surface, whereby additional cleaning effort can be avoided. The adhesive ring should generally be considered as a closed ring, wherein this ring does not necessarily have to have a circular form, but, for instance, can also be of rectangular configuration, in particular following a shape of the main body.

At this point, it should be added that, because of the nature of the method, for example as a result of the space being filled with adhesive through the main body, adhesive can also be found in the apertures or channels of the main body, which adhesive likewise undergoes a curing process. However, adhesive which is found outside the abovementioned space helps only slightly, if at all, to increase the holding force of the main body against the surface, so that adhesive arranged in this way cannot be regarded as fundamental to the invention.

As mentioned in the introduction, the present invention in a second aspect relates to a fastening element for attaching objects to a surface, comprising a main body and an adhesive ring, which define a space for an adhesive, wherein the main body comprises at least one air-permeable and water-permeable connection between the space and an outer side of the main body, said outer side being separated from the space by the main body, wherein the fastening element is suitable for being attached to the surface in accordance with the method according to the invention. In the state attached to the surface, the adhesive ring and the surface form airtight barriers for the adhesive.

Generally, with regard to the configuration of the fastening element or of the main body, reference should also be made to the corresponding text passages of the description of the method according to the invention.

It is here advantageous that the adhesive ring comprises glue, in particular is formed completely of a glue. In this way, the adhesive ring can have a self-adhesive property, so that the fastening element can be prepositioned on the surface and the adhesive can subsequently be introduced through the main body, in particular via a feed-in opening, into the appropriate space, without the fastening element or the main body here having to be held by a person and/or an apparatus. Advantageously, the main body can have at least one outlet opening, via which air and/or surplus adhesive can escape from the space.

Advantageously, the glue can be formed of pure or modified acrylate.

BRIEF DESCRIPTION OF THE DRAWINGS

The invention will be explained in greater detail below on the basis of an illustrative embodiment and with reference to the appended drawings, wherein.

DETAILED DESCRIPTION OF INVENTION

Figure 1:
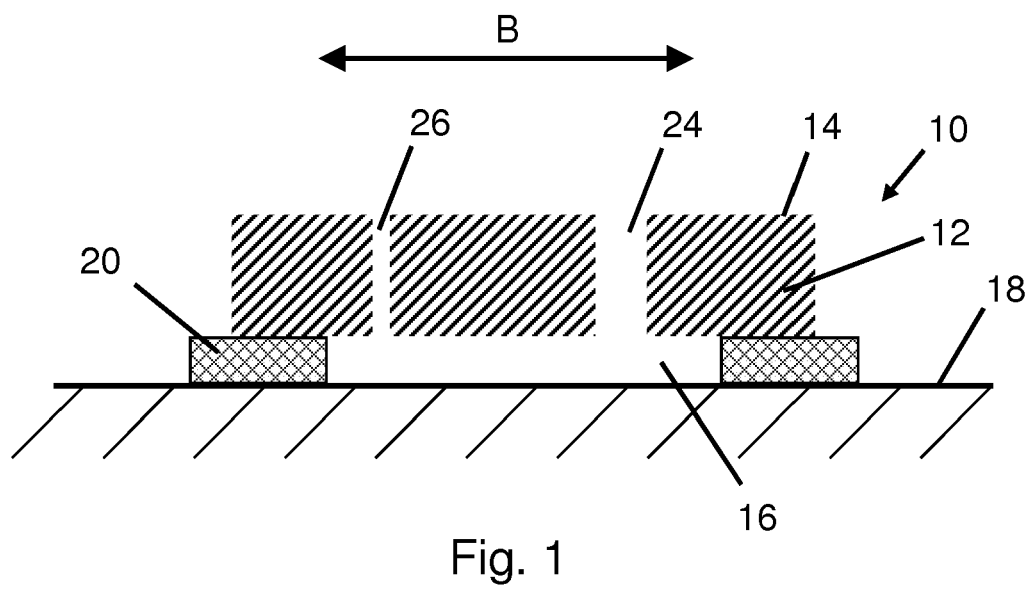
FIG. 1 represents a schematic cross-sectional view of a main body of the fastening element according to the invention.

In FIG. 1, a fastening element according to the invention is denoted in general terms by 10. The fastening element 10 comprises a main body 12, which in this illustrative embodiment is of completely porous configuration.

At this point, it should be noted that the term "porous" is intended to describe a structure which allows a transportation of moisture from, for instance, a top side 14 of the main body 12 through the main body 12 toward a space 16. This can be achieved, for instance, by an open-pored structure of the main body 12.

The main body 12 is here preferably made of a sintered metal, in particular of a bronze compound or a foamed mixed material.

The space 16 is bounded on its side opposite the main body 12 by a surface 18, which constitutes the foundation to which the fastening element 10 is to be attached. The surface 18 is usually constituted by tiles, glazed tiles, stone surfaces or similar foundations.

In the directions running substantially parallel to the surface 18, the space 16 is bounded by an adhesive ring 20. In the illustrative embodiment which is represented here, the adhesive ring 20 fully surrounds the space 16, so that the space 16, with the exception of that side of the space 16 which is bounded by the main body 12, is hermetically sealed toward an environment of the fastening element 10.

As can be seen in FIG. 1, in this embodiment the adhesive ring 20 projects in a width direction B beyond the width extent of the main body 12. This has, on the one hand, the advantage that an effective adhesive surface between the adhesive ring 20 and the surface 18, given constant volume of the space 16, is greater than with an adhesive ring which, in the width direction B, sits flush with the main body 12. On the other hand, this yields the advantage that a joint formed between the surface 18 and the adhesive ring 20 can hereby be reliably closed in an airtight manner even in the case of uneven surfaces.

For the introduction of an adhesive into the space 16, a feed-in opening 24 leading through the main body 12 is provided, so that the space 16 can be filled with a quantity of adhesive 22.

In addition, for the escape of air during the feeding of the adhesive into the space 16 and for the escape of a quantity of adhesive 22 that exceeds the volume of the space 16 and of the feed-in opening 24, an outlet opening 26, which likewise leads through the main body 12, for instance substantially parallel to the feed-in opening 24, is provided.

In a known manner, the main body 12 can have a connecting device, such as, for instance, an external thread and/or at least one internal thread, in order to be able to connect to the main body 12, for example, adapter elements for the reception of objects.

Figure 2:
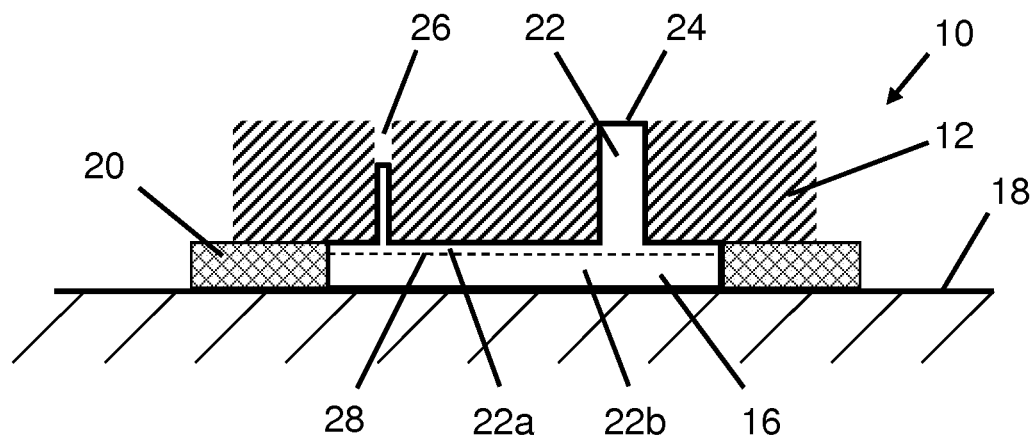
FIG. 2 represents the cross-sectional view from FIG. 1, wherein adhesive has been introduced into the main body.

In FIG. 2, the fastening element 10 from FIG. 1, which is arranged on the surface 18, is represented, wherein, via the feed-in opening 24, the adhesive has been fed into the space 16 and partially into the outlet opening 26. After this, the remaining steps of the method according to the invention were performed, so that that portion 22 of the quantity of adhesive 22 that is facing toward the main body 12 is already cured, while that portion 22b of the quantity of adhesive 22 that is facing away from the main body 12 is not yet cured. The transition between the cured portion 22a of the quantity of adhesive 22 and the not yet cured portion 22b of the quantity of adhesive 22 is represented in FIG. 2 by a dashed line 28.

The not yet cured portion 22b of the quantity of adhesive 22 is thus hermetically sealed to all sides, namely by the surface 18, the adhesive ring 20 and the cured portion 22a of the quantity of adhesive 22, from an environment of the fastening element 10. In this way, even when load is applied to the fastening element 10, no air can make its way to the not yet cured portion 22b of the quantity of adhesive 22, whereby a bubble formation 22 that reduces the holding force could materialize in the quantity of adhesive.

The invention claimed is:

1. A method for attaching a main body (12) of a fastening element (10) to a surface (18), which fastening element is designed to connect objects to the surface (18), wherein the method comprises:
arrangement of the main body (12) in contact against the surface (18), wherein the main body (12) is connected to the surface (18) by an adhesive ring (20), so that the surface (18), the adhesive ring (20) and a joint that is present therebetween form airtight barriers of a space (16) arranged between them and the main body (12), wherein the main body (12) has at least one air-permeable and/or water-permeable connection between the space (16) and an outer side of the main body (12), said outer side being separated from the space (16) by the main body (12), or the main body (12), already upon the arrangement of the main body (12) on the surface (18), contains moisture,
introduction of an adhesive into the space (16), so that this is filled with a quantity of adhesive (22) which has a contact area with the main body (12),
initiation of a curing process for the quantity of adhesive (22) by providing moisture for the quantity of adhesive (22) found in the space (16),
wherein, prior to the initiation of the curing process and/or during the curing process, the adhesive ring (20) and a quantity of adhesive (22) are heated such that a portion of the quantity of adhesive (22) that is found in the region of the contact area and is facing toward the main body (12) forms an insulating layer (22a) which is cured in an areally homogeneous manner over the contact area and which constitutes a further airtight barrier for a remaining portion of the quantity of adhesive (22b) that is facing away from the main body (12) and is not yet cured, so that it is prevented, when a load is applied to the main body (12), air being drawn into the not yet cured portion of the quantity of adhesive (22b).

2. The method as claimed in claim 1, wherein the adhesive is formed of an elastic, moisture-curable single-component glue, or sealant.

3. The method as claimed in claim 1, wherein the heating is performed for a period of 1 minute to 5 minutes.

4. The method as claimed in claim 1, wherein, during the heating, the adhesive ring and the quantity of adhesive are heated to a temperature of 60° C. to 80° C.

5. The method as claimed in claim 1, wherein providing moisture for the quantity of adhesive comprises an application of moisture to the main body.

6. The method as claimed in claim 1, wherein the main body comprises a moisture reservoir originally filled with moisture, which moisture reservoir, in that state of the main body in which it is arranged on the surface, is connected to the quantity of adhesive.

7. The method as claimed in claim 1, wherein the adhesive ring adapts to unevennesses in the surface on which the main body is arranged.

8. The method as claimed in claim 1, wherein the heating is performed for a period of 2 minutes.

9. The method as claimed in claim 1, wherein, during the heating, the adhesive ring and the quantity of adhesive are heated to a temperature of 70° C. to 80° C.

10. The method as claimed in claim 1, wherein the adhesive ring, in the heated state, adapts to unevennesses in the surface on which the main body is arranged.

11. The method as claimed in claim 1, wherein the adhesive ring comprises glue.

12. The method as claimed in claim 1, wherein the adhesive ring is formed completely of a glue.

13. The method as claimed in claim 1, wherein the glue is formed of pure or modified acrylate.

14. A method for attaching a fastening element to a surface, comprising:
- contacting a fastening element to a surface via an adhesive ring, thereby forming a space between the fastening element, the surface, and surrounded by the adhesive ring, wherein the fastening element has at least one of an air-permeable or water-permeable connection between the space and an outer side of the fastening element;
- introducing an adhesive into the space;
- heating the adhesive ring and the adhesive, such that a first portion of the adhesive in contact with the fastening element forms an insulating layer which is cured and forms an airtight barrier for a second portion of not-yet-cured adhesive in contact with the surface, thereby preventing air from being drawn into the second portion of not-yet-cured adhesive when a load is applied to the fastening element; and
- initiating curing for the second portion of not-yet-cured adhesive by providing moisture.

* * * * *